United States Patent [19]

Robinson

[11] Patent Number: 4,663,732
[45] Date of Patent: May 5, 1987

[54] APPARATUS FOR STORING AND RETRIEVING DATA IN PREDETERMINED MULTI-BIT QUANTITIES CONTAINING FEWER BITS OF DATA THAN WORD LENGTH QUANTITIES

[75] Inventor: C. Michael Robinson, Saratoga, Calif.
[73] Assignee: KLA Instruments Corporation, Santa Clara, Calif.
[21] Appl. No.: 582,589
[22] Filed: Feb. 22, 1984
[51] Int. Cl.⁴ .................. G06Z 12/04; G06Z 3/00
[52] U.S. Cl. ............................. 364/900; 364/749
[58] Field of Search ... 364/200 MS File, 900 MS File, 364/749

[56] References Cited

U.S. PATENT DOCUMENTS

| | | | |
|---|---|---|---|
| 4,219,874 | 8/1980 | Gusev et al. | 364/200 |
| 4,447,878 | 5/1984 | Kinnie et al. | 364/200 |
| 4,471,458 | 9/1984 | Weilbacker et al. | 364/900 |
| 4,502,115 | 2/1985 | Eguchi | 364/749 |
| 4,556,960 | 12/1985 | Cohn et al. | 364/900 |

*Primary Examiner*—James D. Thomas
*Assistant Examiner*—Thomas C. Lee
*Attorney, Agent, or Firm*—Hamrick, Hoffman, Guillot & Kazubowski

[57] ABSTRACT

An apparatus for storing and retrieving data in predetermined multi-bit length quantities containing fewer bits of data than word length quantities, including a memory for storing word length quantities at particular storage sites, a first buffer for selectively receiving data bits contained in a first predetermined portion of a word length quantity of data stored at a particular address within the memory, a second buffer for selectively receiving data bits contained in a second predetermined portion of the word length quantity of data stored at the particular address, a third buffer for alternatively receiving data bits contained in the second predetermined portion of the word length quantity of data stored at the particular address, a data bit generator for generating a null signal in the form of a predetermined number of data bits, a data bus having a first data transfer part and a second data transfer part connected to the memory, a CPU for causing the respective first and second portions of data and the null signal to be transferred from the memory and/or the data bit generator through the first, second, or third buffers to the data bus in accordance with one of the three following alternatives:

(a) the first predetermined portion is input to the first part of the data bus, and the second predetermined portion is input to the second part of the data bus; or
(b) the first predetermined portion is input to the first part of the data bus, and the null signal is input to the second part of the data bus; or
(c) the second predetermined portion is input to the second part of the data bus, and the null signal is input to the second part of the data bus.

5 Claims, 3 Drawing Figures

4,663,732

APPARATUS FOR STORING AND RETRIEVING DATA IN PREDETERMINED MULTI-BIT QUANTITIES CONTAINING FEWER BITS OF DATA THAN WORD LENGTH QUANTITIES

BACKGROUND OF THE INVENTION

1. Field of the Invention

This invention relates to apparatus and methods for efficiently utilizing memory space for storing digital data in predetermined multi-bit length quantities containing fewer bits than word length quantities. In particular, this invention relates to the efficient storage and retrieval of digital data generated by video means.

2. Description of the Prior Art

Integrated circuit chips or dice are manufactured by etching a plurality of circuits on a single large, substantially round substrate wafer made of semiconductor material. The plurality of circuits each of which will later form a chip are arrayed on the wafer in a rectilinear fashion with "streets" between adjacent wafers. At various points in the manufacture of the chips, the uncut partially finished wafers must be precisely aligned for probing, testing and the like.

If this alignment process is automated, more wafers can be tested in a given period of time, and if the alignment is routinely more accurate, the yield of useable chips can be imporved. There has been an effort to achieve these two goals in the prior art. In particular, U.S. Pat. No. 4,385,322, issued to Hubach, et al teaches a method of automatically aligning wafers by digitizing a video signal. This signal is digitized to form 1-bit picture element or "pixels" which correspond to an image consisting of only black and white elements. One-bit pixels make arithmetic operations much simpler, but the image is much more prone to uncertainties due to lighting variances, and the like, than a picture with at least some gray levels. The present invention solves some of the problems attendant with the generation and electronic manipulation of multi-bit pixels.

Computers and the like, can store digitized data in memory means. The data is accessible in word length quantities. Frequently, the data acquired by some external means is a shorter than the word length quantity, that is, it contains fewer bits of data than the number of bits in a word length quantity. One possible source of such external data means is video means. If a video signal has four bits of data per pixel, the resulting pixel will have 16 shades of gray, enough to be suitable for many purposes including aligning semicondutor wafers. The data is stored in the internal memory of the computer, to be later addressed by the computer to be processed. However, the storage of the 4-bit data in the memory means is a problem if the data contains fewer bits of information than the addressable word length of the system, for example, 8 bits per word. There have been two conventional choices; storing one pixel of data per addressable word length quantity, thereby not using a significant portion of the available memory, or stacking the data by software techniques, thereby using a significant portion of the Central Processing Units (CPU'S) time unstacking and shifting the data when it is retrieved.

Where some data may be in word length quantities, e.g., 8 bits per word, other data may be in bit length quantities having fewer bits than word length quantities. For example, binary coded decimal data units (BCD) contain four bits of data. If BCD is used in a system with an addressable word length of greater than four bits, it may be desirable to store several BCD numbers at each addressable space thereby more fully utilizing the available memory space of the system.

When pixel data is acquired by a computer for processing, a conventional system has a dedicated fast memory for pixel acquisition and a slower, less costly, memory for the program data required by the system. As both CPU and memory speeds have increased and memory prices have decreased, this division of memory no longer makes sense. The memory of the system should be one large, fast array that stores the pixel data as well as the system program.

When video data is collected too rapidly for the CPU to generate addresses to store the data, a Direct Memory Access (DMA) is used for video data storage. This requires a DMA address generator to supply the addresses where the data is to be stored. When a video camera is used in conjunction with a computer storage system, it is convenient to synchronize the input from the camera to the computer system by providing timing pulses to the camera. Two counters are normally used for related information: one counter locates the pixel in the image and the other counter generates the address where that same pixel should be stored in memory. It would be desirable to merge the two counting functions necessary for pixel acquisition so that the same counter can be used to generate addresses for the DMA and synchronize the video image from the camera.

SUMMARY OF THE PRESENT INVENTION

An object of this invention is to provide efficient storage and retrieval of multi-bit data containing fewer bits of data than word length quantities.

Another object of this invention is to provide means for allowing the same physical memory to store both word length quantities and quantities of data having fewer bits than word length quantities.

A further object of this invention is to provide a means for allowing a camera synchronization counter in a wafer aligning system to simultaneously synchronize the camera and the system, and generate addresses for storage of pixel data.

This invention provides an apparatus for storing data in predetermined multi-bit length quantities containing fewer bits than word length quantities. A memory means stores a word length quantity of data at a storage location having a particular address. A first buffer means selectively receives data bits contained in a first predetermined portion of the word length quantity. A second buffer means selectively receives data bits contained in a second predetermined portion of the word length quantity. A third data means alternately receives data bits contained in a second predetermined portion of the word length quantity. A data bit means generates a null signal in the form of a number of data bits corresponding to the predetermined portion. A CPU means connected to a data bus having a first data transfer part and a second data transfer part activates switching so that data transferred onto the data bus satisfies at least one of the following conditions:

(a) the first predetermined portion is to be input to one of the first and second parts of the data bus and the second predetermined portion is to be input to the other part of the data bus;

(b) the first predetermined portion is to be input to the other part of the data bus and the null signal is to be input to the other part; or (c) the second predetermined portion is to be input to the other part of the data bus and the null signal is to be input to the other part.

IN THE DRAWING

DETAILED DESCRIPTION OF THE PREFERRED EMBODIMENT

Figure 1:
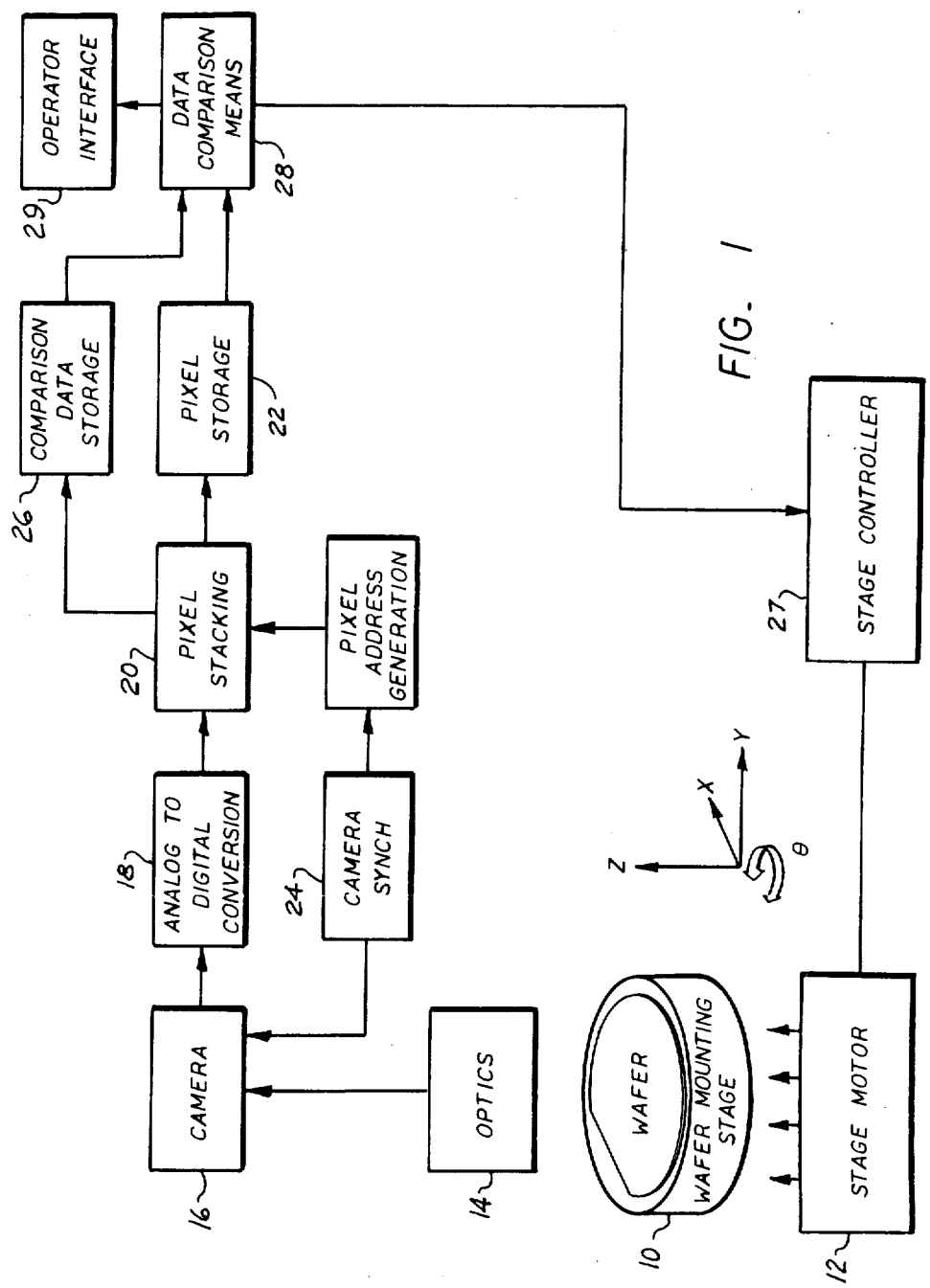
FIG. 1 is an overall schematic diagram of the present invention.

Referring to FIG. 1, an unaligned wafer 10 is shown mounted on a moveable stage 12. The stage can translate in any of the three directions, X, Y or Z and can rotate in the X, Y plane, hereinafter denoted 0. Preferably, a series of wafers are randomly loaded in a magazine and fed onto the stage to be correctly oriented. Each wafer is loaded onto the stage 12 with a random orientation relative to the stage. The wafer is then aligned and the correctly aligned wafer has any of a series of operations performed on it, including testing, photomask alignment, and the like.

To align the wafer, an image of the wafer is formed by the optics 14. Preferably, the optics 14 generates images in pairs; with each image originating from widely separated points on the surface of the wafer. It is preferable that the optics include both a low resolution macro lens and a high resolution micro lens to achieve precision alignment.

The images are taken or "grabbed" by a video camera 16 or the like. Although video cameras are the currently preferred mode, any means that can generate an electronic signal corresponding to the details of of an image, in either analog or digital form, could be successfully used. If conventional video cameras are used, the analog signal produced is digitized by a conventional analog-to-digital conversation means 18.

It has been found that an image having 4-bit pixels, which correspond to 16 grey levels, is entirely satisfactory to accurately align silicon wafers. The preferred system design includes pixel stacking system processors 20 that address 8-bit and 16-bit data in pixel storage memory 22. The 4-bit pixels can be stored one at each addressable space, but at least half the random access memory (RAM) of the machine would go unused. The 4-bit pixels are more efficiently stored by stacking two or four pixels at every addressable location in the RAM.

The camera synchronization means 24 synchronizes the video camera 16 with the system by providing synchronization pulses to the camera. The pixels are assigned addressable locations as each one is received during a video grab. In a preferred embodiment of this invention, the two functions are combined, thereby reducing the number of counters required by the overall system.

In a preferred embodiment, the first wafer provides not only the first data of an unaligned wafer, but also provides data that is stored in a comparison data storage means 26 and compared against each succeeding wafer. Conceptually, it is possible that the comparison data could be obtained externally to the system and loaded onto the system for each wafer type examined. However, the great number of different wafers that may be inspected by this system render this approach impractical.

An alternative approach is to have the system align the first wafer by extensive calculations, and place the correct orientation data into Random Access Memory (RAM). This orientation data then functions as the comparison data. The comparison data storage 26 and the pixel storage 22 are preferably embodied in the same physical RAM.

The data comparison means 28 compares the stored pixel data and the stored comparison data, and is preferably a CPU means with a dedicated program stored in Read Only Memory (ROM) which generates signals that activate the stage controller 27. The stage controller 27 is a separate microprocessor that controls the stage motors 12 that move the mounted unaligned wafer 10 into more accurate alignment by moving the stage motors by moving the stage motors.

Depending on how poorly aligned the wafer was initially, and the desired precision of alignment, the alignment process may take several interations of determining how to move the wafer and then moving it. Once the wafer is aligned precisely enough for the purpose needed, the stage moves laterally to an operational station for testing or the like. The stage then moves the tested wafer back where it is unloaded and the next unaligned wafer is placed on the stage.

An operator interface 24 allows control of the system, and other similar interfaces (not shown) can allow the system to be operated in conjunction with other machines that may be needed for testing, and the like.

Figure 2:
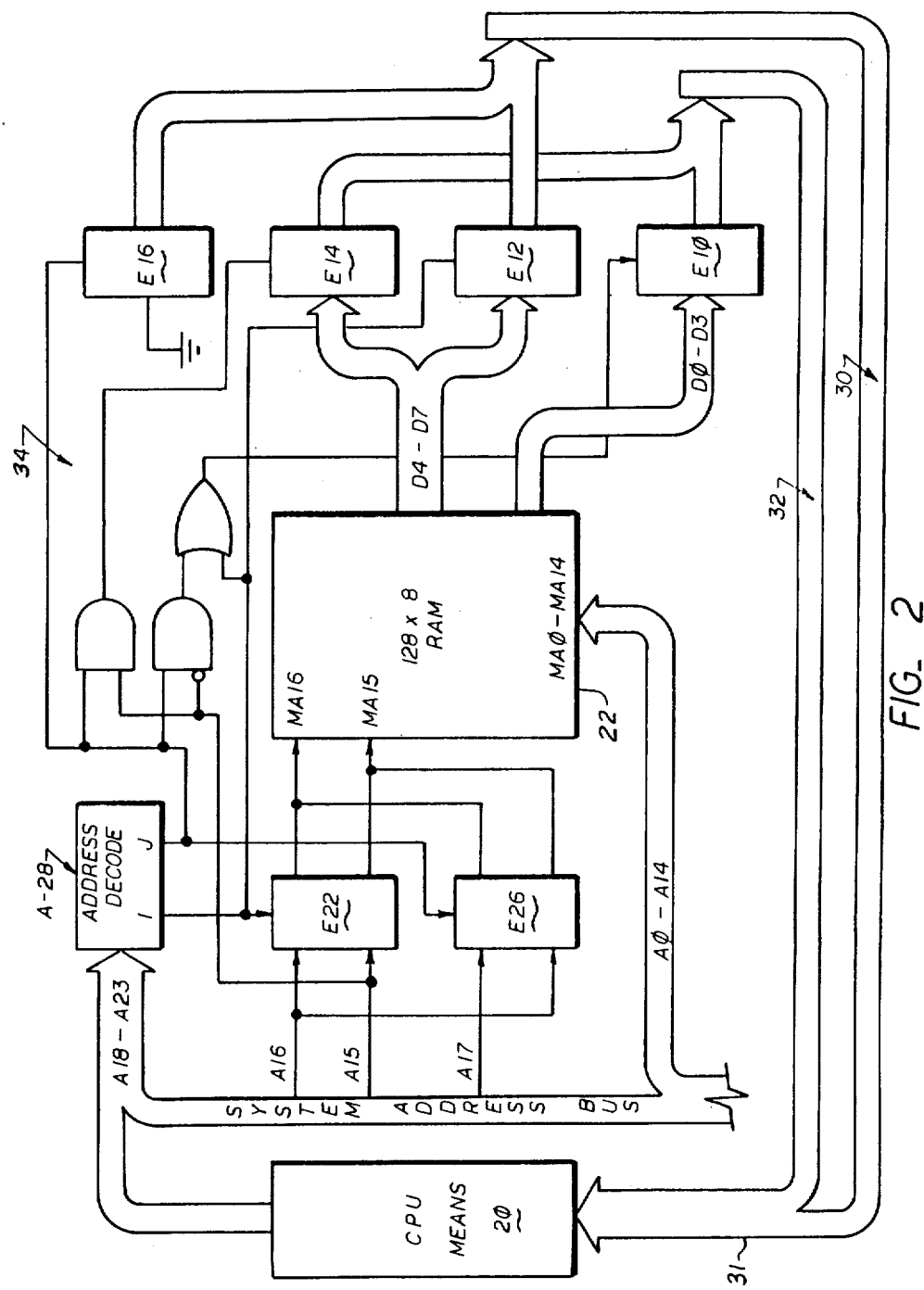
FIG. 2 is a schematic diagram showing pixel stacking apparatus in accordance with the present invention.

Referring now to FIG. 2, a 128K×8 RAM memory 22 containing data word length quantities (8 bits per byte) is addressable by address lines A0 through A17 and outputs data on lines D0 through D7. To address 128K bytes 17 address bits MA0 through MA16 are required as indicated. The data output from the memory 22 is divided into two predetermined 4-bit portions; a first predetermined portion of the data bits in data lines D0 through D3 and a second predetermined portion of the data bits in data lines D4 through D7. Data lines D0 through D3 are connected to a first tri-state data buffer E10. Data lines D4 through D7 are connected to a second tri-state buffer E12, as well as a third tri-state buffer E14. A grounded fourth tri-state buffer E16 acts as a data bit means, creating null data.

The system data bus is divided into a first transfer part 32 and a second transfer part 30. When data is retrieved by the CPU 20, the CPU enables the first, second, and third buffer means, and the data bit means places data on the data bus such that the data on the first transfer part 32 plus the second transfer part 30 satisfies one of the following conditions:

(a) data from the first predetermined portion (4 bits) plus the second predetermined portion (4 bits);

(b) data from the first predetermined portion (4 bits) plus null data (4 bits); and (c) data from the second predetermined portion (4 bits) plus null data (4 bits) means.

Condition (a) is the condition where the system retrieves a word length quantity of data, i.e. 8 bits of data. The conditions (b) and (c) apply when an addressable word length quantity is divided in two thereby generating two new word length quantities i.e. 4 bits of information bearing data and 4 bits of null data that are accessed by the CPU means.

The second predetermined portion of the addressable word can be placed onto the first transfer portion 32 of the system data bus by enabling the third tri-state buffer E14. When the multi-bit data containing fewer bits of data than the system word length is being accessed, the data bit means E16 is enabled, allowing it to generate null data, which is read by the system as a series of zeros, and place it onto the second transfer portion 30 of the system data bus 31. Then, the data on the system data bus is the same as if each pixel had been stored in the least significant portion of a single addressable memory space and zeros had been placed into the more significant portions.

Unique addresses for the multi-bit data quantities can be artificially generated by placing the data into physical memory that does not have as many addressable locations as the CPU can address. A high order address line, that is not used to address the physical memory, can then be used to divide the word length quantities into two uniquely addressed multi-bit data quantities. For example, the signal on such an address line may be a 0 for the first predetermined portion and 1 for the second predetermined portion. If more than two predetermined portions are stored at each addressable location, more than one high order address line must be used.

The CPU means 20 is a microprocessor having 24 address lines (A0 to A23) and 8 data lines (D0–D7). It is anticipated that other CPU means, including minicomputers and the like could practice this invention. The CPU may have more data lines, for example 16. The Motorola 68000 microprocessor has 24 address lines and 16 data lines, but can address byte sized (8-bit) data quantities. By practicing this invention it can access "nibble" sized (4-bit) data quantities. If the CPU and memory means are fast enough, the data for the system can be randomly stored throughout the memory.

Each of the buffers E10–E16 is enabled by a signal that is generated from the system address bus by signal processing logic 34. The address bus is divided into twenty-four address lines, A0 to A23. A0 through A14 are always used to address a word in the RAM array 22. A15 and A16 are used to address MA15 and MA16 when word length quantities are being retrieved. An address decoder A-28 generates a signal to lines I or J depending on whether the word length mode or the multi-bit data mode is being used. The decoder A-28 responds to signals on the higher order address lines, A18 to A23. When line I is active, the first and second buffer means are enabled allowing storage and retrieval of word length quantities from the RAM. When J is active and I inactive, multi-bit data is transferred. Line I also enables a fifth Tri-state buffer 22 that transfers the signal of address line A16 to address line MA15 and the signal of address line A17 to address line MA16. Address line A15 is then used as an enable switch for the third buffer means.

It will be noted that when I is enabling the fifth tri-state buffer E22, the first and second tri-state buffers E10 and E12 are enabled but not the *third and fourth* buffers E14 and E16. When Line I is inactive and line J is active, the input from line A15 enables either the first or third buffer means in response to conventional logic 34, and the second tri-state buffer E12 is not enabled. The logic shown assumes that I and J and the enable inputs are active-high. Data from each addressable location within the RAM 22 is placed on the first transfer portion of the system data bus when line J is active. The first predetermined portion and then the second predetermined portion of each addressable location is placed onto the first transfer portion of the system data bus. The second transfer portion has a null data signal, generated by tri-state buffer E16 which is enabled by the signal from line J when the system is in the multi-bit data retrieval mode.

Multi-bit data is stored in RAM 22 as a stack of two multi-bit data quantities of predetermined length. For example, a memory may contain four-bit pixel data which is stored in a system with an addressable word length of eight bits. Two four-bit quantities are stacked at each addressable eight bit word location within the memory. When multi-bit data is retrieved, a multi-bit word appears at the inputs of the first buffer E10 and the third buffer E14. Depending on the value of A15, either the first buffer and the fourth buffer are enabled placing a word satisfying the condition (b) first predetermined portion plus null data onto the system data bus 32, or the second and fourth buffers E12 and E16 respectively, are enabled placing a word that satisfies the condition (c) second predetermined portion plus null data onto the system data bus 30.

The invention is general for any system having a larger word length than the digitized data that is stored. For example, many systems have word length quantities that are sixteen bits long. To store four bit data quantities on these systems, one need only have one tri-state buffer for every four data lines from the memory array. The high order address bits would be used to generate enable signals allowing each buffer to place its data onto the first transfer portion of the system data bus while placing null data onto the other twelve data lines of the system data bus.

Figure 3:
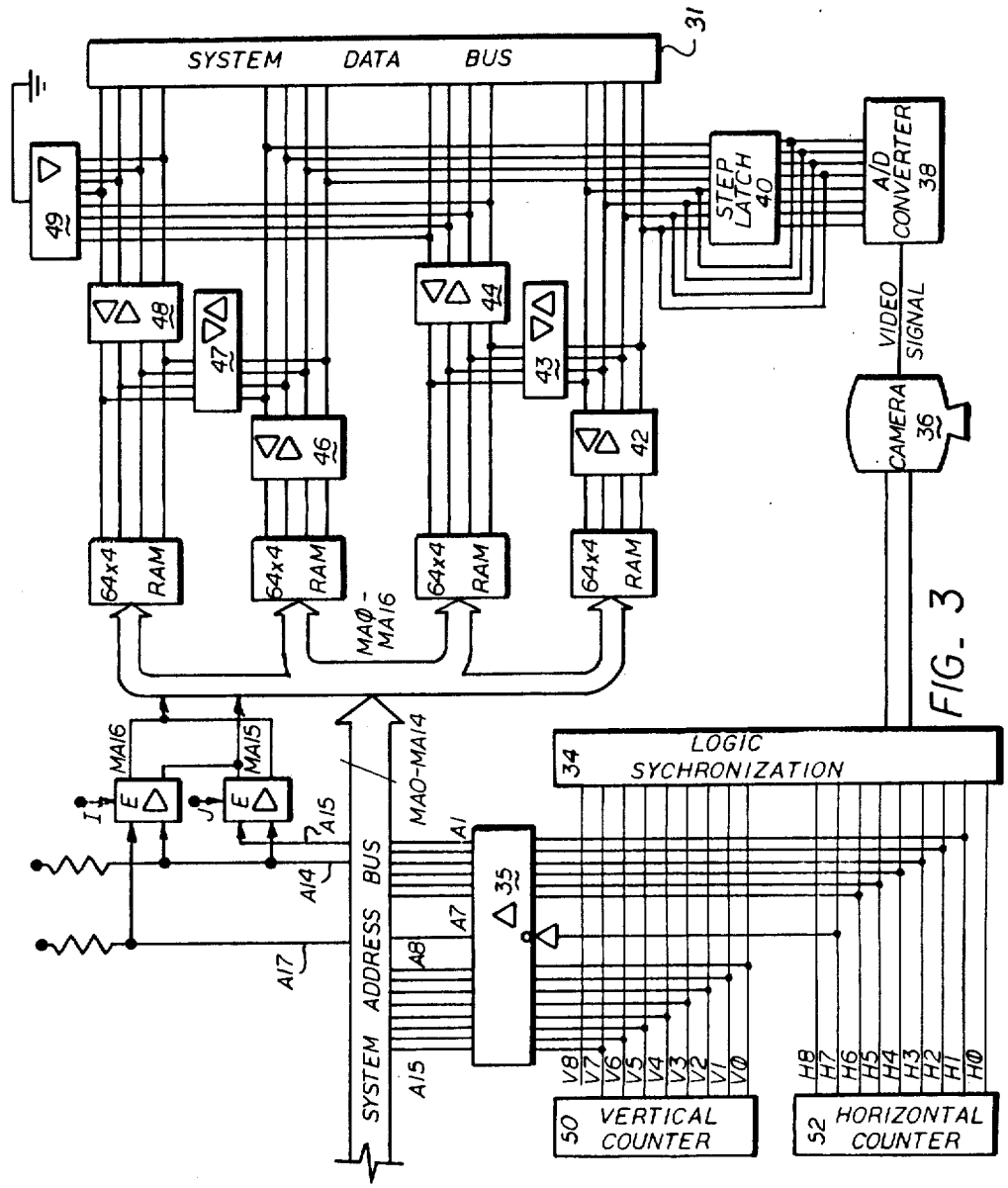
FIG. 3 is a schematic diagram showing pixel stacking and automatic address generation apparatus in accordance with the present invention.

Accurately and rapidly aligning a wafer or the like using conventional video cameras such as that illustrated at 36 in FIG. 3 requires a picture 256×256 pixels square that uses 4-bit pixels. Standard video equipment, when generating an image with non-interlaced scan lines, generates a picture having 389×262 pixels as the closest approximation. In accordance with the present invention the camera sychronization therefore requires two 9-bit counters, one for the 262 horizontal scan lines; the vertical counter 50, and one for the 389 pixels per scan line; the horizontal counter 52. The horizontal scan counter 52 counts from 07B to 1FF (in hexadecimal notation). If the part of the picture that is of interest lies between the counts 080 and 17F (or 010000000 and 101111111 in binary notation), numbers 0 to 7F can be derived by inverting H7. The write enable signal for the RAM MA0–MA16, shown as four 64K×4 RAM units, will only be active during this portion of the horizontal scan line. This is sufficient for generating the low order part of the pixel address. The next eight bits, the high order bits, are generated by the vertical scan counter 50 (outputs V0–V7) which counts from 0FC to 1FF. Since only 8 address lines are needed for 256 lines, the ninth vertical count V8 need not be used and the numbers 0 to 7F can be derived directly from the counter. The first few lines are the vertical blanking interval. Since V8 is not used for address coding, data can be written into RAM for the vertical blanking interval.

If the RAM array is fast enough, the camera synchronization counters could have any combination of lines used to genrate addresses for pixels. For example, H7 is inverted in the above described embodiment because doing so generates a number series starting with zero. But conceptually, it could be non-inverted, or the pixels could even be stored randomly. Depending on the address bits which are chosen to discriminate between the word access mode and the multi-bit data mode, the order in which the pixels appear in memory will be different. Normally, pixels would be retrieved in the multi-bit data mode, so if they are to appear in order they must be written into memory in the same mode, i.e., line J being active and line I inactive. If this data were retrieved in the word access mode, it would appear to be out of order. For example, if A15 were used to select between the two halves of a word then the two halves would be separated in address by the value 32768 in the multi-bit data mode.

The reason for this is that the software would normally never need to access pixels in the word access mode. Therefore, peculiarities in the data, when accessed in this mode, can be tolerated. The advantage gained thereby is that only 3 address bits, A15, A16 and A17, need to be shifted. If the data were ordered in both modes, all 18 address bits would have to be shifted.

Once the pixels have been stored in RAM at known locations, the image can be recreated, or processed by the CPU means. In the application of interest, the image can be electronically compared to a comparison data base. A data comparison means generates a signal that enables the stage controller to rotate or translate the stage to precisely align the wafer.

As illustrated in FIG. 3, the video camera 36 is synchronized to a DMA having a horizontal scan line counter 52 and a vertical scan line counter 50.

The horizontal scan counter and the vertical scan counter are connected to a camera synchronization logic unit 34. Address lines A1 to A7 are connected to horizontal scan counter bits H1 through H7 through a tri-state buffer 35. Line H7 is inverted by an inverter (not shown). Address lines A8 to A15 are connected to vertical scan counter lines V0 through V7. The remaining high order address bits are forced to a fixed value during the video grab.

Video camera 36 generates a signal which is converted into a digital signal by an analog to digital converter 38. 4-bit digital data is grouped into twos in latch 40 and written to memory sending the lower order pixel to a first buffer 42, and the higher order pixel to a second buffer 46. Pixels in the upper half of this memory space, i.e., higher order pixels in the word access mode, ar placed in RAM by a third buffer 43 and a fourth buffer 47. Null data is generated with grounded input buffer 49 when memory is read in the multi-bit data mode. Other features of this Figure operate in a manner such as that discussed relative to FIG. 2.

While this invention has been described in the form of specific preferred embodiments, it is contemplated that modifications thereof will become apparent to those skilled in the art after having read the preceeding description of the preferred embodiments. It is therefore intended that the following appended claims be interpreted as covering all such modifications as fall with the true spirit and scope of this invention.

What is claimed is:

1. An apparatus for storing and retrieving data in predetermined multi-bit length quantities containing fewer bits of data than word length quantities wherein said predetermined multi-bit length is a predetermined submultiple of said word length, comprising:

memory means for storing word length quantities of data at storage sites having particular addresses whereby each word length quantity of data includes a multiple of said predetermined multi-bit length quantities of data;

a first buffer means for selectively receiving data bits of said predetermined multi-bit length contained in a first predetermined portion of a word length quantity of data stored at a particular address within said memory means;

a second buffer means for selectively receiving data bits of said predetermined multi-bit length contained in a second predetermined portion of said word length quantity of data stored at said particular address within said memory means;

a third buffer means for alternately receiving data bits of said predetermined multi-bit length contained in said second predetermined portion of said word length quantity of data stored at said particular address;

data bit means for generating a null signal in the form of a predetermined number of data bits of said predetermined multi-bit length;

data bus means having a first data transfer part and a second data transfer part connected to the memory means;

a CPU means connected to the data bus means, said CPU means causing the respective first and second portions of data and said null signal to be transferred from said memory means and/or said data bit means through said first, second and third buffer means to said data bus means in accordance with one of the following alternatives:

(a) said first predetermined portion to be input to said first part of said data bus means and said second predetermined portion to be input to said second part of said data bus means when a word length quantity of data is retrieved from said memory means;

(b) said first predetermined portion to be input to said first part of said data bus means and said null signal to be input to said second part of said data bus means when data of said predetermined multi-bit length is retrieved from said memory means; and (c) said second predetermined portion to be input to said first part of said data bus means and said null signal to be input to said second part of said data bus means when data of said predetermined multi-bit length is retrieved from said memory means.

2. The apparatus of claim 1 wherein said memory means is a RAM array organized to store n bits of data per addressable storage site, said first part of said data bus is organized to transmit m bits of data, where m is less than n, and said second part of said data bus is organized to transmit p bits of data, where m+p=n.

3. The apparatus of claim 2 wherein said first buffer means, said second buffer means, and said third buffer means are tri-state buffers.

4. The apparatus of claim 3 wherein the first and second tri state buffers can be enabled to transfer word length quantities of data onto the system data bus, and said first and third tri-state buffers can be alternately enabled to transfer predetermined length portions of data onto the first data transfer part of the system data bus.

5. The apparatus of claim 1 wherein said first predetermined portion and said second predetermined portion are each comprised of no more than m bits of data and said data bus accommodates the transfer of at least n bits of data, where n is an integer and a multiple of m.

* * * * *